United States Patent [19]
Nose et al.

[11] Patent Number: 5,791,785
[45] Date of Patent: Aug. 11, 1998

[54] HYDRODYNAMIC BEARING APPARATUS

[75] Inventors: Tamotsu Nose; Masato Gomyo; Masamichi Hayakawa, all of Nagano, Japan

[73] Assignee: Sankyo Seiki Mfg. Co., Ltd., Nagano-ken, Japan

[21] Appl. No.: 800,055

[22] Filed: Feb. 14, 1997

[30] Foreign Application Priority Data

Feb. 16, 1996 [JP] Japan .................................. 8-054200

[51] Int. Cl.$^6$ .................................................. F16C 32/06
[52] U.S. Cl. ..................................... 384/119; 384/107
[58] Field of Search ............................... 384/100, 107, 384/111, 112, 113, 114, 118, 119, 121, 123, 124, 132

[56] References Cited

U.S. PATENT DOCUMENTS

| | | | |
|---|---|---|---|
| 4,795,275 | 1/1989 | Titcomb et al. | 384/107 |
| 5,423,612 | 6/1995 | Zang et al. | 384/119 |
| 5,427,456 | 6/1995 | Hensel | 384/112 |
| 5,433,529 | 7/1995 | Hensel | 384/119 X |
| 5,516,212 | 5/1996 | Titcomb | 384/112 |
| 5,533,811 | 7/1996 | Polch et al. | 384/107 |

FOREIGN PATENT DOCUMENTS 6-178492  6/1994  Japan .

*Primary Examiner*—Thomas R. Hannon
*Attorney, Agent, or Firm*—McAulay Fisher Nissen Goldberg & Kiel, LLP

[57] ABSTRACT

A hydrodynamic bearing apparatus for use in a spindle motor. The bearing includes at least two hydrodynamic bearing sections for supporting a rotary member with respect to a fixed member, a hydrodynamic pressure generating mechanism, a space between the two hydrodynamic bearing sections, a lubricant, two capillary sealing sections, and a lubricant reservoir. In the hydrodynamic bearing apparatus, the hydrodynamic pressure generating mechanism is positioned at the hydrodynamic bearing sections, and the capillary sealing section of the two capillary sealing sections has a space capacity which allows for an increased amount of lubricant. The lubricant is moved by a predetermined amount in one direction by a differential pressure generated at the hydrodynamic bearing sections when the rotary member rotates.

13 Claims, 4 Drawing Sheets

HYDRODYNAMIC BEARING APPARATUS

BACKGROUND OF THE INVENTION a) Field of the Invention

This invention relates to a hydrodynamic bearing apparatus in which a hydrodynamic pressure is generated in a lubricant, and a rotary member is supported with respect to a fixed member thereby.

b) Description of the Related Art

In recent years, in various apparatus such as motors, various hydrodynamic bearing apparatus that use a hydrodynamic pressure generated in a lubricant such as an oil have been studied and suggested to meet the demand for high rates of rotation in particular. In a hydrodynamic bearing apparatus, a hydrodynamic surface on a fixed member side and that on a rotary member side are arranged opposite each other; hydrodynamic pressure generating grooves are formed on at least one of these facing hydrodynamic surfaces; a lubricant such as an oil interposed between the facing surfaces of the rotary member and the fixed member is pressurized by a pumping action of the hydrodynamic pressure generating grooves during the rotation of the rotary member, to support the rotation of the rotary member by the hydrodynamic pressure of the lubricant.

As described, a hydrodynamic bearing apparatus has a lubricant such as an oil (hereafter simply called a lubricant) in a bearing section, and generally can be classified in the following three types based on the structure for retaining the lubricant.

(1) Partial lubricant filling structure (See Tokkai H6-178492, for example)

This is the simplest hydrodynamic bearing structure in which a lubricant is filled only in the bearing section, and an air layer is formed between the bearings.

(2) Lubricant circulating structure (see U.S. Pat. No. 4,795,275, for example)

This is a structure in which the lubricant is also filled in the space between the bearings, and both ends of the bearing are in communication by a circulating hole, wherein the lubricant is circulated so that internal pressure differences (differential pressures) generated during rotation are canceled. With this structure, it is possible to maintain a sufficient amount of the lubricant to prolong the usable life of the bearing and to advantageously prevent the lubricant from leaking externally since the internal pressure differences (differential pressures) of the lubricant are always canceled by the circulating hole.

(3) One side recession retaining structure (see U.S. Pat. No. 5,427,456, for example)

This structure is made by forming a recessed bearing clearance by closing one end in the axial direction of the bearing section with a wall, and by creating only one outlet where the bearing clearance communicates with air, wherein any pressure differences generated in the lubricant are sustained by the one-side recession retaining structure. According to this structure, since the lubricant can be prevented from moving, it is possible to obtain an inexpensive hydrodynamic bearing structure, to prolong usable life and to prevent lubricant leakage.

Each of the above mentioned conventional hydrodynamic bearing structures has associated problems. With the "partial lubricant filling structure" of (1), it is difficult to control the injected amount of lubricant, and the absolute amount of lubricant is small due to the small space in the bearing section, shortening the absolute usable life. In addition, if the lubricant amount is increased by widening the filling space for the lubricant to cancel the above problem, the lubricant would easily leak. Further, since the volume of the air layer between the bearings increases and decreases due to changes in atmospheric pressure and temperature, it is easy for the lubricant to move and leak; therefore, it is required to provide a countermeasure for its prevention by providing a hole communicating with the outside and the like.

With the "lubricant circulating structure" of (2), the structure became complicated due to the circulating hole, providing poor productivity and expensive manufacturing cost.

With the "one side recession retaining structure" of (3), as a result of providing a one-side recessed bearing section, the shaft member is limited to a structure for retention of lubricant no matter which bearing structure is used, a shaft rotation type or a shaft fixed journal type, and therefore, the usage is limited.

OBJECT AND SUMMARY OF THE INVENTION

For these reasons, this invention aims to provide a hydrodynamic bearing apparatus of wide applicability which has a simple and inexpensive structure, prevents the lubricant from leaking, and prolongs the usable life of the bearing.

In accordance with the invention, a hydrodynamic bearing apparatus comprises at least two hydrodynamic bearing sections for relatively rotatably supporting a rotary member with respect to a fixed member. The sections are formed so that they together constitute a continuous bearing clearance along a shaft. A hydrodynamic pressure generating portion is formed on at least one of the fixed member and the rotary member constituting each of the hydrodynamic bearing sections. The hydrodynamic pressure generating portion is for generating hydrodynamic pressure in a lubricant filled in the bearing clearance. Space between the two hydrodynamic bearing sections is in communication with an outer side and a lubricant is provided per hydrodynamic bearing section. Two capillary sealing sections made by tapering the space between the fixed member and the rotary member are provided at both ends of the bearing clearance at the two hydrodynamic bearing sections. The hydrodynamic pressure generating portion at the hydrodynamic bearing section is made in an asymmetrical pattern so that a predetermined differential pressure moving in one direction in the bearing clearance is generated by rotation to move said lubricant in one direction in said bearing clearance. The capillary sealing sections, of the two capillary sealing sections, which is downstream in the moving direction of the lubricant is set to have a space capacity for allowing an increased amount of the lubricant due to its movement. The lubricant is moved by a predetermined amount in one direction by differential pressure generated at the hydrodynamic bearing sections when the rotary member rotates. The differential pressure is nullified in that the lubricant disappears from a part of the hydrodynamic pressure generating portion at the hydrodynamic bearing section. The increase of the lubricant due to its movement is tolerated in the capillary sealing section downstream in the moving direction of the lubricant. A lubricant reservoir of a larger space dimension than the space constituting said capillary sealing sections is formed between the capillary sealing section downstream in the moving direction of the lubricant and the hydrodynamic bearing section.

DESCRIPTION OF THE PREFERRED EMBODIMENTS

Figure 1:
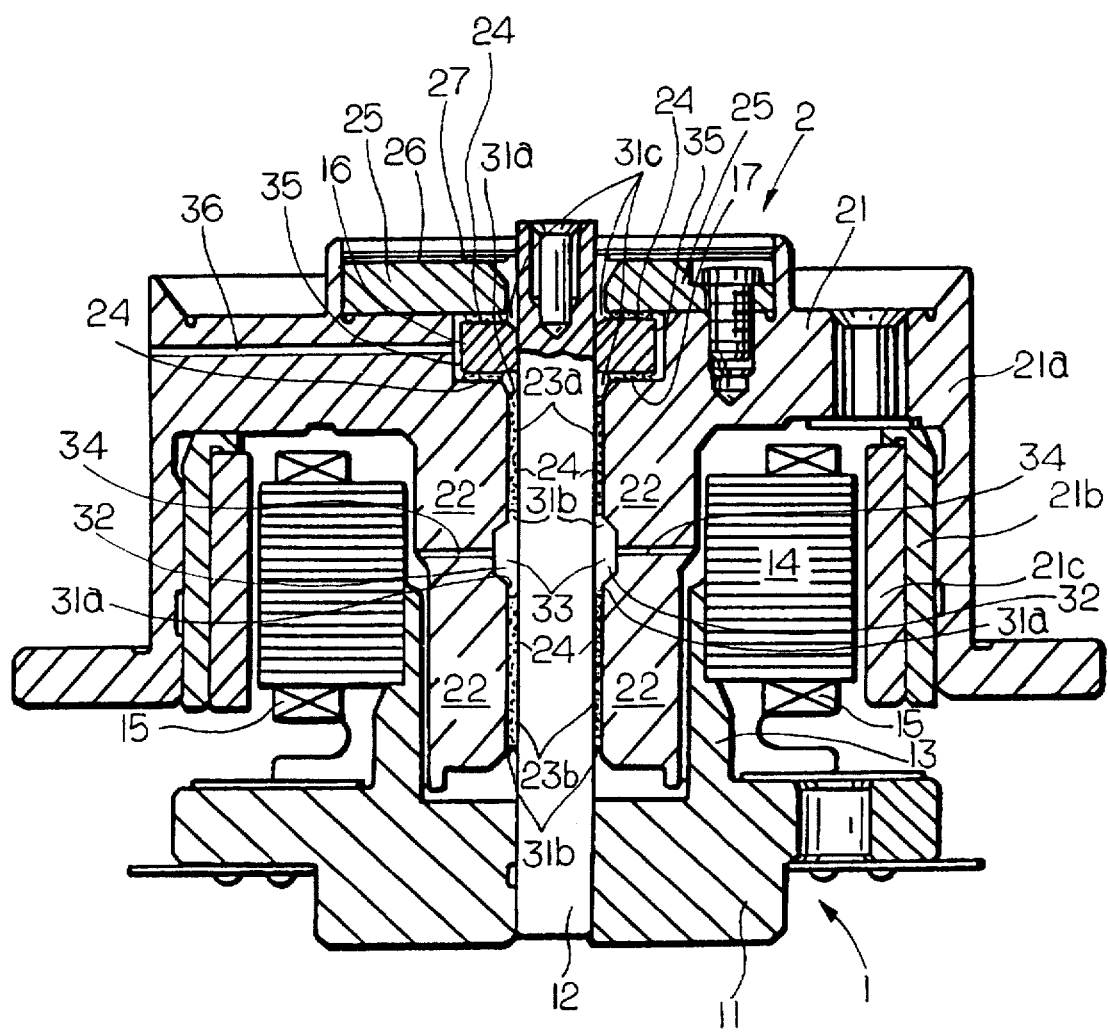
FIG. 1 is a descriptive cross section showing one example of a HDD spindle motor having a hydrodynamic bearing apparatus of an embodiment of this invention.

In order to achieve the above objectives, we list here points necessary to satisfy (1) the condition for preventing lubricant from leaking, (2) the condition for prolonging an usable life, and (3) the condition for manufacturing a radial hydrodynamic bearing at low cost and excellent productivity.

(1) The condition for preventing lubricant from leaking:

1-1 In order to prevent lubricant from leaking, it is necessary that the interface of the lubricant is within a small space between a fixed member and a rotary member.

In particular, if a large inertial force is added to a hydrodynamic bearing, it is difficult to retain the lubricant only with the sealing force of a capillary or magnetic type. In this case, it is necessary to use the hydrodynamic pressure generated by a fluid viscous drag of the lubricant as the lubricant retaining force. It is also necessary to narrow the space, in which the interface of the lubricant is positioned, smaller than a predetermined space to enlarge the hydrodynamic pressure-by the fluid viscous drag of the lubricant.

Further, in order to position the interface of the lubricant within the narrow space, it is necessary that:

a) the interface position and amount of the lubricant do not vary no matter what condition the apparatus is in;

b) the interface position can be controlled during injection of the lubricant so that it can be easily positioned within a designated location; and c) an extra capacity to some extent is provided at areas before and after the designated interface location in the narrow space.

1-2. Another condition to prevent lubricant from leaking outside is that the capillary sealing force sometimes can be used when the apparatus is stopped. In other words, it is necessary that a pull-back force by capillary action continuously acts as a force to maintain the lubricant at a predetermined position inside the bearing.

1-3. In order to prevent lubricant from leaking outside, it is also necessary that the internal differential pressure of the lubricant is canceled during rotation, being balanced.

That is, the differential pressure, generated in the lubricant due to hydrodynamic pressure or centrifugal force generated during rotation, becomes much larger than the sealing pressure in general; for example, if the pressure is different between two exits, the lubricant moves until the pressure difference is canceled, by which external leakage is sometimes caused. In other words, in order to prevent the lubricant from leaking externally, it is necessary to construct the apparatus in which the above mentioned pressure difference is canceled with a small moving amount of the lubricant to balance it, or in which the pressure difference is sustained such as in a one side recession retaining structure.

(2) The condition to prolong the usable life:

It is necessary to retain extra lubricant, several times more than the lubricant filled in the bearing section, to prolong the usable life because a chemical change is caused due to abrasion particles mixed into the lubricant by the use of the bearing, and evaporation and leakage are caused to a certain degree by material nature and other conditions, causing deterioration and loss of the lubricant. For this reason, the usable life of the hydrodynamic bearing is measured by these standards: how much extra lubricant can be retained inside and how much loss of the lubricant caused by evaporation and leakage can be reduced.

(3) The condition to manufacture the apparatus with low cost and excellent productivity.

In order to achieve this, as a matter of fact, it is important to construct the apparatus as simple as possible.

Embodiments are described in detail in which this invention is applied to a so-called fixed shaft journal type HDD spindle motor hereinafter referring to the drawings.

FIG. 1 shows an overall structure of an HDD spindle motor. The HDD spindle motor is constituted of a stator assembly 1 (a fixed member) and a rotor assembly 2 (a rotary member) mounted to the stator assembly 1 from the top. The stator assembly 1 has a frame 11 screwed onto a fixed base of a body of a hard disk drive (HDD) (not illustrated), and a journal 12 standing in the center of the frame 11 extends upwardly in the figure. The tip end (the top end in the figure) of the journal 12 is screwed onto the fixed base of the body of a magnetic disk apparatus (not illustrated).

The frame 11 has a hollow cylindrical supporting holder 13, a stator core 14 is fitted to the outer circumference of the supporting holder 13, and a coil 15 is wound around salient-poles of the stator core 14.

The rotor assembly 2 has a hub 21 for supporting a predetermined magnetic recording medium (not illustrated), and the hub 21 is rotatably supported with respect to the journal 12 via a pair of radial hydrodynamic bearing sections 22 and 22 arranged at the center of the hub 21.

The hub 21 has a cylindrical frame section 21a, and a magnetic recording medium such as a magnetic disk is loaded to the outer circumference thereof. An annular drive magnet 21c is mounted annularly to the inner circumference of the frame section 21a via a back yoke 21b such that it closely faces the outer circular surface of the stator core 14.

Figure 2:
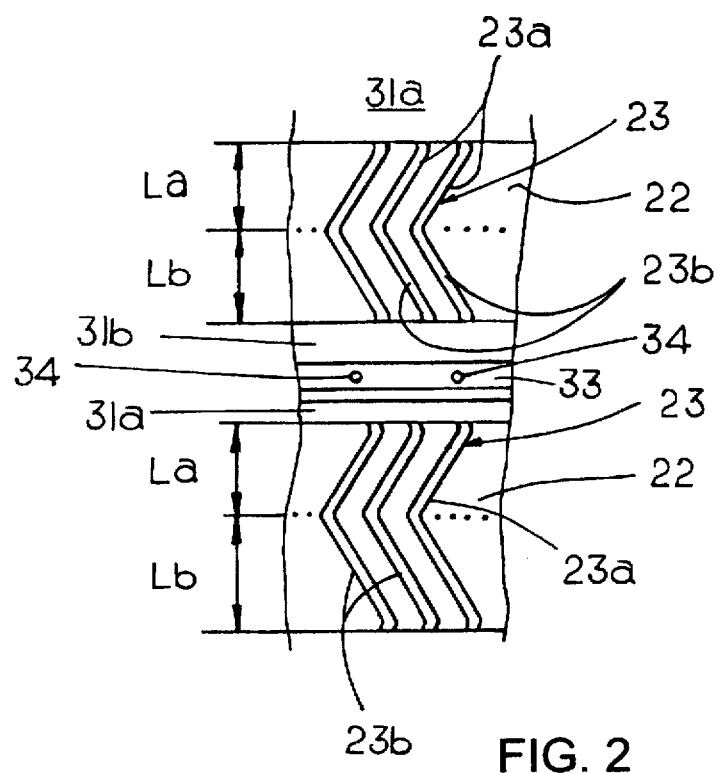
FIG. 2 is a development elevation of one example of radial hydrodynamic pressure generating grooves.

The pair of radial hydrodynamic bearing sections 22 and 22 may be formed of a separate member; in this invention, however, they are formed integrally on the inner circular surface of the hub 21, and axially arranged by a predetermined space. An inner circular surface of each of the radial hydrodynamic bearing sections 22 and 22 and the outer circular surface of the journal 12 are arranged opposite each other via a bearing clearance made of the space of several μm. On at least one of the facing surfaces of the radial hydrodynamic bearing section 22 and of the journal 12, herringbone-configured radial hydrodynamic pressure generating grooves 23 as shown in FIG. 2 are grooved such that they are annularly in parallel, and a lubricant 24 made of an oil, magnetic fluid, and the like is interposed between both facing surfaces.

An air reservoir 33 is formed between both the radial hydrodynamic bearing sections 22 and 22, axially separating them; the lubricant 24 is filled separately in each of the radial hydrodynamic bearing sections 22 and 22. A plurality of air paths 34 are radially extending outwardly in the radius direction in the hub 21 from the air reservoir 33; the ends of the air paths open to the space outside the hub 21.

The lubricant 24 is pressurized to generate a hydrodynamic pressure by the pumping action of the radial hydrodynamic pressure generating grooves 23 when the hub 21 rotates, and the hub 21 is shaft-supported in a radial direction by the hydrodynamic pressure generated in the lubricant 24. The herringbone pattern of the radial hydrodynamic pressure generating grooves 23 will be described later.

As the lubricant 24 is used an oil composed of esterified trimethylolpropane (TMP) or pentaerythritol (PE) and a linear or branched fatty acid having $C_{5-18}$ to obtain both a usable life of the lubricant 24 and excellent bearing properties. In particular, it is preferable to use oil having an evaporation rate of $10^{-7}$ g/h·cm² (at 40° C.) or less and a viscosity of 30 cP (at 40° C.) or less.

Figure 4:
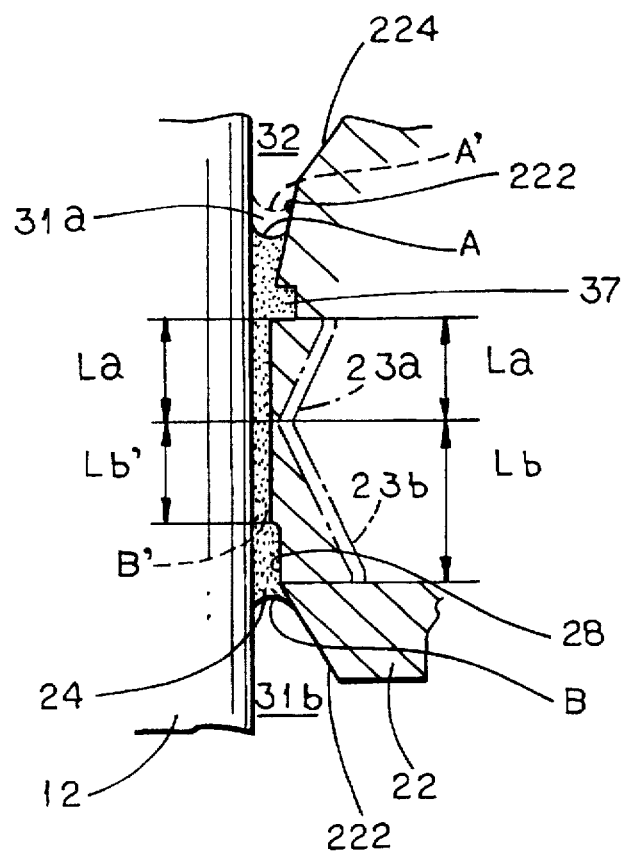
FIG. 4 is a partially magnified cross-section showing the structure of a capillary sealing section in each of the radial hydrodynamic bearing sections.

Each of the two radial hydrodynamic bearing sections 22 and 22, as shown in FIG. 4, is provided axially at both ends of the bearing clearance between the outer circular surface of the journal 12 and the hub 21 such that two capillary sealing sections 31a and 31b made by tapering the space between the journal 12 and the radial hydrodynamic bearing section 22 sandwich the hydrodynamic bearing section 22 axially from both ends. Capillary sealing sections 31a and 31b are provided at the ends of the radial hydrodynamic bearing section 22. Specifically, the capillary sealing sections are made by tapering the spaces between the outer circular surface of the journal 12 and the inclined inner circular walls for sealing 222 axially at both ends (the top and bottom in the figure) of the radial hydrodynamic bearing section 22; the tapered space constituting the lower capillary sealing section 31b is directly communicated with the space (bearing clearance) which constitutes the bearing section of the radial hydrodynamic bearing section 22; and a concave section for widening the space is not provided at the communicating section between the capillary sealing section 31b and the bearing section of the radial hydrodynamic bearing section 22.

An annular thrust plate 16 constituting two thrust hydrodynamic bearing sections 17 and 17 is secured half way up the top end (the upper end in the figure) of the journal 12. The two thrust hydrodynamic bearing sections 17 and 17 constituted at the top and bottom surfaces of the thrust plate 16 are arranged such that they are above the radial hydrodynamic bearing sections 22.

Figure 3:
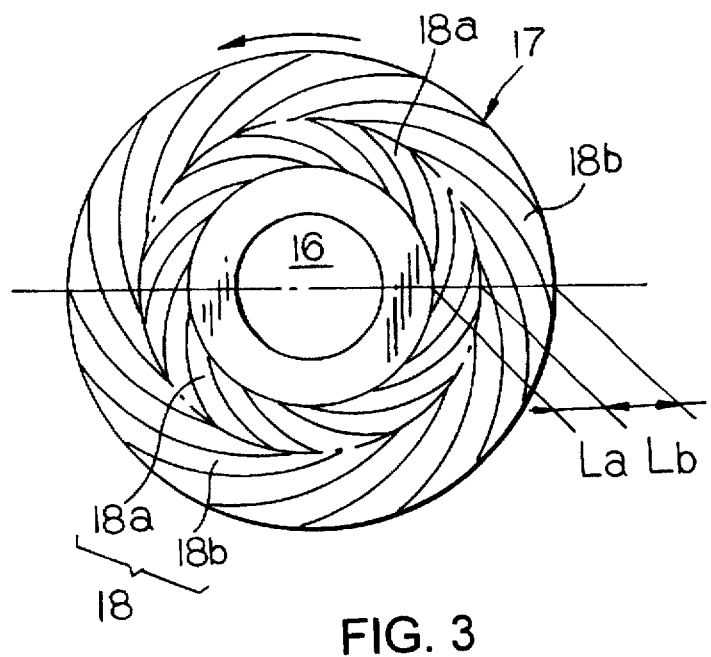
FIG. 3 is a development elevation of one example of thrust hydrodynamic pressure generating grooves.

In other words, the bottom surface (in the figure) of the thrust plate 16 faces the top surface of the upper radial hydrodynamic bearing section 22, and the top surface of the thrust plate 16 faces the bottom surface of a thrust pressing plate 25 which is screwed onto the center area of the hub 21; on both surfaces of the thrust plate 16 constituting the thrust hydrodynamic bearing sections 17 and 17, herringbone-configured thrust hydrodynamic pressure generating grooves 18 as shown in FIG. 3 are annularly formed respectively. Also, the same lubricant 24 as that filled in the aforementioned radial hydrodynamic bearing section is interposed between the facing surfaces of the thrust plate 16 and the top surface of the radial hydrodynamic bearing section 22 and between the facing surfaces of the thrust plate 16 and the thrust pressing plate 25.

Between both thrust hydrodynamic bearing sections 17 and 17, an air reservoir 35 is formed for axially separating the thrust hydrodynamic bearing sections 17 and 17, and the lubricant 24 is separately filled in each of the thrust hydrodynamic bearing sections 17 and 17. A plurality of air paths 36 radially extend into the hub 21 from the air reservoir 35 outwardly in the radius direction; the ends of the air paths 36 open to the space outside the hub 21.

When the hub 21 rotates, the lubricant layers 24 and 24 are pressurized to generate a hydrodynamic pressure by a pumping action of the thrust hydrodynamic pressure generating grooves 18 and 18, and thereby, the hub 21 is shaft-supported in the thrust direction. The herringbone pattern of the thrust hydrodynamic pressure generating grooves 18 and 18 will be described later.

Figure 5:
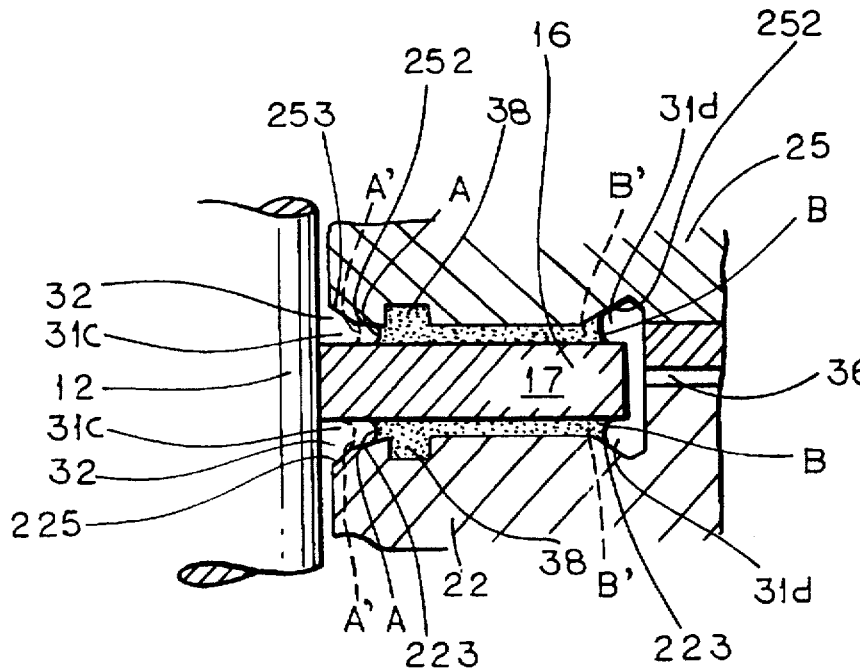
FIG. 5 is a partially magnified cross section showing the structure of a capillary sealing section in the thrust hydrodynamic bearing section.

The thrust hydrodynamic bearing sections 17 and 17, as shown in FIG. 5, are formed such that they are sandwiched radially from both sides by two capillary sealing sections 31c and 31d made by tapering the dimension of the space between the thrust plate 16 and the radial hydrodynamic bearing section 22, and the bearing clearance between the thrust plate 16 and the thrust pressing plate 25. In other words, each of the capillary sealing sections 31c and 31d is provided at a part of the thrust hydrodynamic bearing section 17; specifically, they are formed by tapering inclined inner circular walls for sealing 252 and 223 of the thrust pressing plate 25 and of the radial hydrodynamic bearing section 22.

A joint between the thrust pressing plate 25 and the hub 21 is completely sealed by an adhesive, thus maintaining excellent sealability against the lubricant 24. The adhesive applied to the joint is filled over the entire periphery of the joint without interruption by the capillary force of annular guiding grooves (not illustrated) formed on the joint, and thereby the sealing structure is made compete.

Each capillary sealing section 31a, 31b, 31c, 31d is formed such that the tapered space constituting the capillary sealing section opens outwardly of the apparatus or toward the air reservoir 33 or 35. Further, in order to constitute the tapered spaces for the capillary sealing sections 31a, 31b, 31c, and 31d, the inner circular wall of the radial hydrodynamic bearing section 22 facing the journal 12 and the inner circular wall of the thrust pressing plate 25 are formed with inclined walls 222, 223, and 252 that continuously widens the dimensions of the spaces outwardly of the apparatus or toward the air reservoirs 33 and 35. The sections whose tapered dimension is between 20 μm and 300 μm are made for the capillary sealing sections 31a, 31b, 31c, and 31d. Oil repellent is also coated at the outer portions of the capillary sealing sections 31a, 31b, 31c, 31d for preventing the lubricant 24 from leaking outside.

The lubricant 24 is respectively filled in the radial bearing clearance between the two capillary sealing sections 31a and 31b and in the thrust bearing clearance between two capillary sealing sections 31c and 31d; the interfaces of the lubricant 24 are, as shown by solid lines A and B respectively in FIGS. 4 and 5, are set to be placed at predetermined positions in the capillary sealing sections 31a and 31b when the motor is stopped.

When the motor rotates, the upper interface of the lubricant 24 in FIG. 4 and the interface on the inner circular side in FIG. 5 move to the positions (shown respectively by dashed lines A'), and the interfaces after moving are maintained respectively within the capillary sealing sections 31a and 31c. On the other hand, the lower interface in FIG. 4 and the interface on the outer circular side in FIG. 5 move to the positions (shown respectively by dashed lines B') which are internal of the radial hydrodynamic bearing section 22 and the thrust hydrodynamic bearing section 17. Such movement of the lubricant 24 is next described.

The herringbone-patterned hydrodynamic pressure generating grooves 23 formed in the radial hydrodynamic bearing section 22 are configured, as shown in FIG. 2, by annularly arranging a pair of diagonal grooves in parallel which extend axially from both ends and meet each other at the center of the radial hydrodynamic bearing section 22. Each of the diagonal grooves constituting each of the hydrodynamic pressure generating grooves 23a and 23b are formed with a groove depth of several μm, and pressurizes the lubricant 24 axially from both ends toward the center. The axial length Lb of the diagonal groove at the bottom of the pair of hydrodynamic pressure generating grooves 23a and 23b is set longer than the axial length La of the diagonal groove at the top, i.e., (Lb>La). By configuring the grooves in an axially asymmetrical pattern, the upward pressure generated by the bottom diagonal groove 23b surpasses the downward pressure generated by the top diagonal groove 23a, causing a predetermined differential pressure axially in one direction (upward in the figure) in the lubricant 24.

In such a way, the differential pressure generated in the lubricant 24 by the radial hydrodynamic bearing section 22 moves the lubricant 24 upwardly to displace it. However, the capillary sealing section 31a downstream (the top in the figure) in the moving direction of the lubricant 24, as shown in FIG. 4, is set to have a space capacity for allowing the increase (deviated amount), increased by the movement of the lubricant 24 during rotation of the motor so that the interface of the lubricant 24 at the inner circular side is maintained within the sealing section 31a even when the motor rotates (See the dashed line A' in FIG. 4).

At the thrust hydrodynamic bearing section 17 in FIG. 3, a pair of hydrodynamic pressure generating grooves 18a and 18b are configured such that the radius length Lb of the diagonal groove 18b radially at the outer side is actually set longer than the radius length La of the diagonal groove 18a radially at the inner side, i.e., (Lb>La). In other words, by configuring the grooves in a radially asymmetrical pattern, the pressure generated by the diagonal grooves 18b radially on the outer side surpasses the pressure generated by the diagonal grooves 18a radially on the inner side; therefore a differential pressure moving radially inwardly, i.e., a predetermined differential pressure is generated in the lubricant 24 moving from the outer capillary sealing section 31d to the inner capillary sealing section 31c.

In such a way, the differential pressure generated in the lubricant 24 by the thrust hydrodynamic bearing section 17 moves the lubricant 24 from the capillary sealing section 31d side to the capillary sealing section 31c side. However, the capillary sealing section 31c downstream (the inner circular side) in the moving direction of the lubricant 24 is set to have a space capacity for allowing the increase (deviated amount), increased by the movement of the lubricant 24 during rotation of the motor, and the interface of the lubricant 24 on the inner circular side is kept within the capillary sealing section 31c even when the motor rotates (See the dashed line A' in FIG. 5).

Specifically, the capillary sealing sections 31a and 31c downstream in the moving direction of the lubricant 24 are set to be 0.5 mm or longer in the displacing direction, and the space capacity or the dimension of the capillary sealing sections 31a and 31c is set three times or more larger or longer than that of the capillary sealing sections 31b and 31d where the lubricant 24 decreases due to the movement of the lubricant 24. Also, the space dimension of the capillary sealing sections 31a and 31c, which tolerate the increase of the lubricant 24 due to its movement, is set larger than the actual space dimension of the capillary sealing sections 31b and 31d where the lubricant 24 decreases, that is, the space dimension including the hydrodynamic pressure generating grooves 23 and 18 in the radial hydrodynamic bearing section 22 and thrust hydrodynamic pressure generating grooves 17. With this configuration, an allowance can be provided for the variation in injected amount of the lubricant 24, and an extra amount can be provided for the decrease of the lubricant 24 due to its movement and evaporation.

Since the capillary sealing sections 31b and 31d upstream in the moving direction of the lubricant 24 are provided at the outer end of the radial hydrodynamic bearing section 22 and the thrust hydrodynamic bearing section 17, when the lubricant 24 is moved by the above mentioned differential pressure, all the lubricant 24 in each of the capillary sealing sections 31b and 31d moves the position as shown by the dashed lines B' in FIGS. 4 and 5, and the lubricant 24 also disappears from a part of the radial hydrodynamic bearing section 22 and the thrust hydrodynamic bearing section 17.

In other words, as shown in FIG. 4, the lubricant 24 runs dry over approximately ¼ of the length Lb, the longer side, of the hydrodynamic pressure generating grooves 23b due to the movement of the lubricant 24 caused by the differential pressure generated when the hub 21 rotates; the interface moves to the point at which the length Lb' of the lubricant 24 left in the hydrodynamic pressure generating grooves 23b becomes approximately equal to the axial length La, the shorter side, of the hydrodynamic pressure generating grooves 23a. The hydrodynamic pressure generated in the longer hydrodynamic pressure generating grooves 23b is decreased by the amount the lubricant ran dry to cancel the differential pressure. This method of canceling the differential pressure is performed for the thrust hydrodynamic bearing section 17 shown in FIG. 5 in the same manner.

Also as shown in FIGS. 4 and 5, lubricant reservoirs 37 and 38 are provided between the capillary sealing sections 31a, 31c downstream in the moving direction of the lubricant 24 and the adjacent hydrodynamic bearing sections 22 and 17; the reservoirs 37 and 38 have a larger dimension of the space than that of the space constituting the capillary sealing sections 31a and 31c. The lubricant reservoirs 37 and 38 are constituted of annular grooves of a horizontal recession in cross section, and a predetermined amount of extra lubricant 24 is held in the lubricant reservoirs 37 and 38.

As shown in FIG. 4, at the section of each of the radial hydrodynamic bearing sections 22 where the lubricant 24 runs dry and disappears, a hollow section 28 is formed to make the space of the section wider than the space between the bearing surface above, and thereby, the inner circular surface of the radial hydrodynamic bearing section 22 does not contact the outer circular surface of the journal 12 even when a sudden force such as an impact is added when the lubricant 24 is running dry and disappearing. The hollow section 28 may be made such that the space dimension is approximately 2 μm longer than that between the bearing surfaces by creating a step as shown in FIG. 4, or the outermost space dimension of the hollow section 28 is about 0.5 μm to 3 μm longer than that of the bearing surface by making it in a tapered shape.

Lubricant inlets 32 are respectively provided outside the capillary sealing sections 31a and 31c such that they are continuous to the capillary sealing sections 31a and 31c. The lubricant inlets 32 and 32 are constituted of widened spaces continuous with the tapered spaces which constitute the capillary sealing sections 31a and 31c, and are formed by making the inner circular walls of rotary members, the radial hydrodynamic bearing section 22 and the thrust pressing plate 25, with a larger opening angle than that of the inclined walls 222, 223, and 252 constituting the capillary sealing sections 31a and 31c to constitute inclined walls for injection 224, 225, and 253.

The inclined walls 224, 225, and 253 constituting the lubricant inlets 32 and 32 are formed with an opening angle of 70° or less so that the lubricant 24 axially or radially flows well, and the space dimension at the outermost end of the lubricant inlets 32 and 32, i.e., the dimension of the space between the journal 12 and the outermost end of the inclined wall 224, or the dimension of the space between the thrust plate 16 and the outermost end of the inclined wall 253 of the thrust pressing plate 25 is set to be 400 μm or more. The space capacity of the lubricant inlet 32 is set larger than the capacity of the bearing clearance connecting the two capillary sealing sections 31a and 31b and that connecting the capillary sealing sections 31c and 31d; therefore, the entire amount of the lubricant 24 can be temporarily injected into the lubricant inlet 32; after that, the lubricant 24 is guided internally to the bearing side (the bottom side in the figure) by capillary force, and refills the entire length of the bearing clearance on release of the air.

As shown in FIG. 1, a thin stopper plate 27 is provided to the thrust plate 25 from the outside (from the top in the figure) via an absorber cloth 26; the lubricant 24 is surely prevented from externally dispersing by the absorber cloth 26 and the stopper plate 27.

According to the above mentioned embodiment, the interfaces of the lubricant 24 are within the capillary sealing sections 31a, 31b, 31c, and 31d formed by the tapered spaces between the journal 12 and rotary members, the radial hydrodynamic bearing section 22 and the thrust pressing member 25; therefore, the capillary sealing force is always ready to work even when the apparatus is stopped as well as during rotation. For this reason, with a pull-back force of the capillary sealing force, the lubricant 24 can be maintained at predetermined positions.

When a large inertial force is added, the hydrodynamic pressure due to fluid viscous drag of the lubricant 24 is generated in the capillary sealing sections 31a, 31b, 31c, and 31d made of tapered spaces; this acts as a main retaining force to prevent the lubricant 24 from dispersing outside the apparatus.

During rotation, a differential pressure is intentionally generated in the lubricant 24 at the radial hydrodynamic bearing section 22 and the thrust hydrodynamic bearing section 17, and the lubricant 24 keeps moving until the differential pressure is canceled by balanced forces. Since the capillary sealing section 31a and 31c downstream in the moving direction of the lubricant 24 are set to have a space capacity for allowing the deviation of the lubricant caused by the movement, the lubricant 24 is prevented from leaking.

The capillary sealing sections 31a, 31b, 31c, and 31d are simply formed by the inclined surfaces 222, 223, and 252, simplifying manufacture and improving productivity.

Moreover, the lubricant reservoirs 37 and 38 having a larger dimension than that of the space of the capillary sealing sections 31a and 31c are provided between the capillary sealing sections 31a, 31c downstream in the moving direction of the lubricant 24 and the hydrodynamic bearing sections 22, 17; therefore, the extra amount of the lubricant 24 is increased due to the lubricant reservoirs 37 and 38, thus prolonging the usable life of the hydrodynamic bearings.

Figure 6:
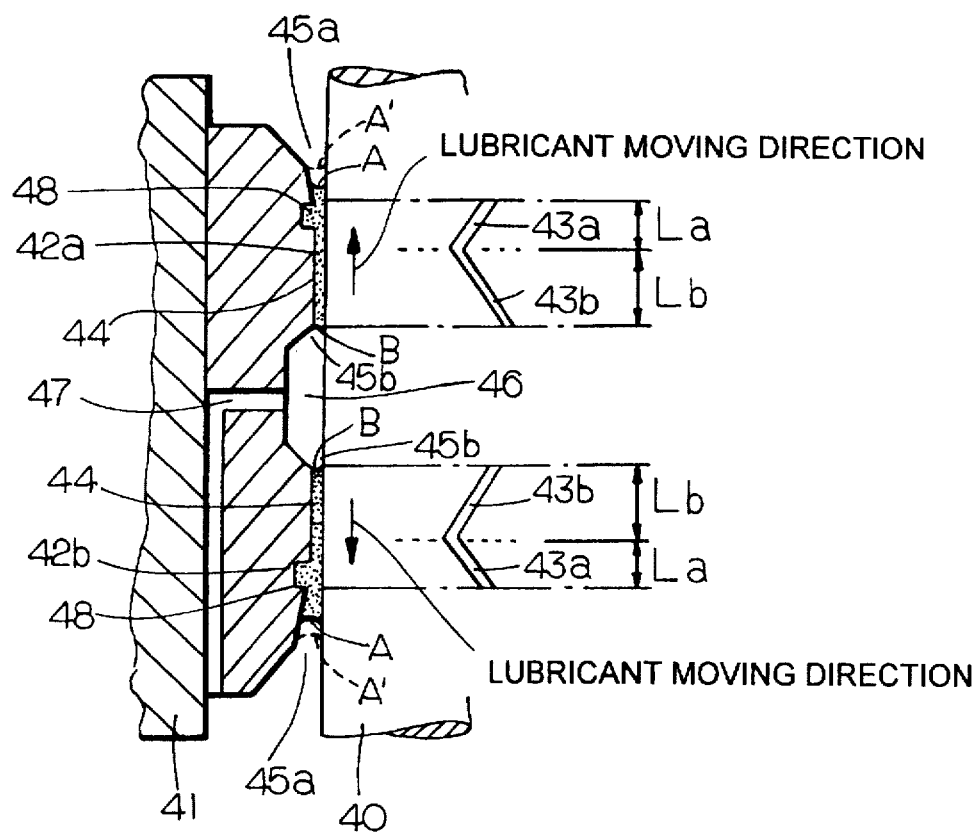
FIG. 6 is a half cross section showing an embodiment in which this invention is applied to a hydrodynamic bearing apparatus having two radial hydrodynamic bearing sections.

In an embodiment shown in FIG. 6, this invention is applied to a hydrodynamic bearing apparatus in which two radial hydrodynamic bearings 42a and 42b are axially arranged together; a shaft member 40 and a cylindrical member having a cylindrical facing surface to the shaft member 40 are relatively rotatably supported via the two radial bearing sections 42a and 42b.

The two radial bearing sections 42a and 42b are formed on the cylindrical member 41. On at least one of the facing surfaces of radial hydrodynamic bearing sections 42a and 42b and the shaft member 40, herringbone-configured radial hydrodynamic pressure generating grooves 43a and 43b are grooved as normal, and a lubricant 44 made of an oil, a magnetic fluid, and the like is interposed between the facing surfaces.

An air reservoir 46 is formed between the radial hydrodynamic bearing sections 42a and 42b, and thereby, the radial hydrodynamic bearing sections 42a and 42b are axially separated; the lubricant 44 is filled in each of the radial hydrodynamic bearing sections 42a and 42b. An air path 47 radially extends in the hub from the air reservoir 46 outwardly in the radius direction, is curved downwardly in the figure at the half way, extends downwardly along the inner circular surface of the hub 41, and opens to the outside.

Two capillary sealing sections 45a and 45b are provided axially at both ends of the bearing clearance of each of the radial hydrodynamic bearing sections 42a and 42b in the same manner as in the previously described embodiment such that they sandwich the two radial hydrodynamic bearing sections 42a and 42b from the outer side in the apparatus and from both ends of the air reservoir 46. In other words, the capillary sealing sections 45a and 45b are formed in a part of each of the radial hydrodynamic bearing sections 42a and 42b.

The capillary sealing sections 45a and 45b at the top and bottom are provided along the shaft such that the tapered spaces constituting the sealing sections 45a and 45b open outwardly of the apparatus and to the air reservoir 46. The inner circular walls of the radial hydrodynamic bearing sections 42a and 42b respectively facing the journal 12 are formed as inclined walls which continuously widen the space dimension outwardly in the apparatus and to the air reservoir 46 in the same manner as in the previous embodiments so that they constitute tapered spaces for the capillary sealing sections 42a and 45b.

At the radial hydrodynamic bearing sections 42a and 42b, a pair of hydrodynamic pressure generating grooves 43a and 43b are configured such that the axial length Lb of the diagonal groove axially on the inner side is longer than the axial length La of the diagonal groove axially on the outer side, i.e., (Lb>La). By forming the grooves axially asymmetrical in this manner, the outward pressure by the diagonal groove axially on the inner side surpasses the inward pressure by the diagonal groove axially on the outer side, thus generating a predetermined differential pressure in the lubricant 44 to move outwardly in the axial direction.

Each of the lubricants 44 moves axially outwardly (upward or downward in the figure) by the differential pressure generated in the lubricants 44 at the radial hydrodynamic bearing sections 42a and 42b. The capillary sealing section 45a downstream in the moving direction of each of the lubricant 44 (outwardly in the axial direction) is set to have a space capacity for allowing the deviation of the lubricant 44 due to its movement, and the interfaces of the lubricant 44 can be maintained within the capillary sealing section 45a (See the dashed line A' in FIG. 7). At the capillary sealing section 45b upstream in the moving direction of each of the lubricant 44 (inward in the axial direction), when each of the lubricant 44 is moved axially outwardly by the differential pressure, the entire lubricant 44 and 44 in the capillary sealing sections 45b and 45b, and a part of the lubricant 44 and 44 in the radial hydrodynamic bearing sections 42a and 42b disappear due to the movement.

Further, between the capillary sealing sections 45a, 45a downstream in the moving direction of the lubricant 44 and their corresponding hydrodynamic bearing section 42a, 42b are provided lubricant reservoirs 48 and 48 having a larger space dimension than that of the spaces which constitutes the capillary sealing sections 45a and 45a. The lubricant reservoirs 48 and 48 are formed of grooves of horizontal recession in cross section, which are grooved annularly around the shaft, and a predetermined amount of extra lubricant 44 is held in the lubricant reservoirs 48 and 48. Even in the apparatus of such embodiment, the same operation effects as in the above described embodiment can be obtained.

The embodiments devised by this invention have been described in detail above; however, this invention is not limited to these embodiments, but it is modifiable within the range of this invention, needless to say.

Figure 7:
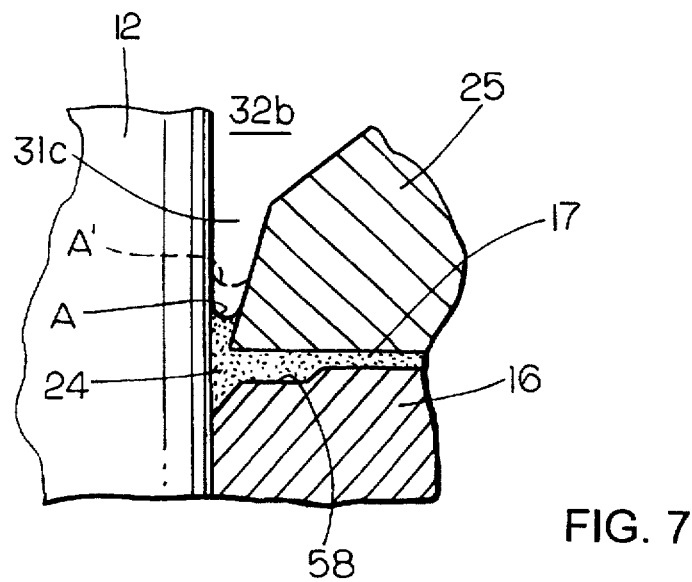
FIG. 7 is a partially magnified cross section showing another embodiment of the lubricant reservoir.

In other words, the lubricant reservoir is not limited to its groove pattern as described in the above embodiments, but may be formed with steps like the lubricant reservoir 58 as shown in FIG. 7, or may be formed obtaining a certain space. Further, as shown in FIG. 7, the capillary sealing section 31c related to the thrust hydrodynamic bearing 17 is provided along the shaft in the space created with the journal 12, and the lubricant inlet can be provided thereabove.

Moreover, the hydrodynamic pressure generating grooves to which this invention is applied are not limited to the herringbone pattern as in the above embodiments, but this invention can be applied to hydrodynamic pressure generating grooves of any other pattern.

The above mentioned embodiments are ones in which this invention is applied to a fixed shaft type motor; however, the invention can be applied to a rotary shaft type motor in the same manner. This invention also can be applied to any hydrodynamic bearing apparatus other than an HDD motor.

As described above, this invention can provide a hydrodynamic bearing apparatus, wherein capillary sealing sections constituted by tapered spaces between a fixed member and a rotary member are provided at both ends of the bearing clearance to prevent the lubricant from dispersing outside by a hydrodynamic pressure caused by a fluid viscous drag of the lubricant in addition to a conventional pull-back force by a capillary force, even when a large inertial force is added; and a differential pressure is intentionally generated in the lubricant at hydrodynamic bearing sections, for moving the lubricant to cancel the differential pressure in the lubricant; thereby, lubricant leakage is prevented which is normally caused during rotation. For these reasons, this invention can excellently prevent the lubricant from leaking and prolong the usable life, widening the applicability of a hydrodynamic bearing apparatus.

While the foregoing description and drawings represent the preferred embodiments of the present invention, it will be obvious to those skilled in the art that various changes and modifications may be made therein without departing from the true spirit and scope of the present invention.

What is claimed is:

1. A hydrodynamic bearing apparatus comprising:
   at least two hydrodynamic bearing sections for relatively rotatably supporting a rotary member with respect to a fixed member, said sections being formed so that they together constitute a continuous bearing clearance along a shaft;
   hydrodynamic pressure generating means being formed on at least one of said fixed member and said rotary member constituting each of said hydrodynamic bearing sections for generating hydrodynamic pressure in a lubricant filled in said bearing clearance;
   space between said two hydrodynamic bearing sections being in communication with an outer side; a lubricant being provided per hydrodynamic bearing section;
   two capillary sealing sections made by tapering the space between said fixed member and said rotary member being provided at both ends of said bearing clearance at said two hydrodynamic bearing sections;
   said hydrodynamic pressure generating means at said hydrodynamic bearing sections being made in an asymmetrical pattern so that a predetermined differential pressure moving in one direction in said bearing clearance is generated by rotation to move said lubricant in one direction in said bearing clearance;
   the capillary sealing section of said two capillary sealing sections, which is downstream in the moving direction of said lubricant, being set to have a space capacity for allowing an increased amount of the lubricant due to its movement;
   said lubricant being moved by a predetermined amount in one direction by differential pressure generated at said hydrodynamic bearing sections when said rotary member rotates, said differential pressure being nullified in that said lubricant disappears from a part of said hydrodynamic pressure generating means at said hydrodynamic bearing section, and the increase of said lubricant due to its movement being tolerated in the capillary sealing section downstream in the moving direction of said lubricant; and
   a lubricant reservoir of a larger space dimension than the space constituting said capillary sealing sections being formed between said capillary sealing section downstream in the moving direction of the lubricant and the hydrodynamic bearing section.

2. The hydrodynamic bearing apparatus as set forth in claim 1, wherein the spaces between said fixed member and said rotary member, which constitute said capillary sealing sections, are continuously widened outwardly from the bearing side.

3. The hydrodynamic bearing apparatus as set forth in claim 1, wherein said capillary sealing sections are formed such that the space between said fixed member and said rotary member is set to be between 20 µm to 300 µm.

4. The hydrodynamic bearing apparatus as set forth in claim 1, wherein of said two capillary sealing sections, the capillary sealing section on the side for allowing the varied amount of the lubricant due to the movement of said lubricant has a space capacity at least three times larger or an axial length at least three times longer than that of the capillary sealing section on the side where said lubricant decreases due to the movement.

5. The hydrodynamic bearing apparatus as set forth in claim 1, wherein of said two capillary sealing sections, the capillary sealing section on the side for allowing the deviation of said lubricant due to its movement has a larger space dimension than the dimension of an actual bearing clearance including said hydrodynamic pressure generating means at said hydrodynamic bearing section on the side where said lubricant decreases due to its movement.

6. The hydrodynamic bearing apparatus as set forth in claim 1, wherein the length of the capillary sealing section on the side for allowing the variation of said lubricant due to the movement of said lubricant is set to be at least 0.5 mm.

7. The hydrodynamic bearing apparatus as set forth in claim 1, wherein a lubricant inlet having an inclined wall which constitutes a wide space is provided at the outer side of said capillary sealing section so that the space thereof is continuous with said capillary sealing section; said inclined wall of said lubricant inlet being formed with an angle of at most 70° opening outwardly; and the space dimension at the outermost end of said lubricant inlet being set to be at least 400 µm.

8. The hydrodynamic bearing apparatus as set forth in claim 7, wherein the space capacity of said lubricant inlet is set larger than the capacity of the bearing clearance between two capillary sealing sections.

9. The hydrodynamic bearing apparatus as set forth in claim 1, wherein said hydrodynamic pressure generating means is formed in a herringbone-pattern in which a pair of diagonal grooves extending axially from both ends meet at the center; and said pair of diagonal grooves are configured in that the length of the groove on the side the lubricant disappears is longer than that on the other side so that a differential pressure is generated.

10. The hydrodynamic bearing apparatus as set forth in claim 9, wherein said space dimension of the position at which said lubricant disappears is formed larger than that of the bearing section.

11. The hydrodynamic bearing apparatus as set forth in claim 1, wherein said lubricant is made of an oil having an evaporation rate of $10^{-7}$ g/h·cm$^2$ at 40° C. and a viscosity of at most 30 cP at 40° C.

12. The hydrodynamic bearing apparatus as set forth in claim 1, wherein said lubricant is of an oil composed by esterifying trimethylolporpane (TMP) or pentaerythritol (PE) and a linear or branched fatty acid having $C_{5-18}$.

13. The hydrodynamic bearing apparatus as set forth in claim 1, wherein said fixed member is provided as a shaft member or a cylindrical member, and said rotary member is provided as a cylindrical member or a shaft member.

* * * * *